United States Patent
Zhu et al.

(10) Patent No.: US 12,110,987 B2
(45) Date of Patent: Oct. 8, 2024

(54) DIVERTER VALVE

(71) Applicant: SUZHOU INDUSTRIAL PARK KALERM ELECTRIC APPLIANCES CO., LTD, Suzhou (CN)

(72) Inventors: Meisheng Zhu, Suzhou (CN); Zhaoliang Wang, Suzhou (CN)

(73) Assignee: SUZHOU INDUSTRIAL PARK KALERM ELECTRIC APPLIANCES CO., LTD, Suzhou (CN)

( * ) Notice: Subject to any disclaimer, the term of this patent is extended or adjusted under 35 U.S.C. 154(b) by 170 days.

(21) Appl. No.: 17/890,487

(22) Filed: Aug. 18, 2022

(65) Prior Publication Data

US 2022/0390034 A1 Dec. 8, 2022

Related U.S. Application Data

(63) Continuation of application No. PCT/CN2021/078967, filed on Mar. 3, 2021.

(30) Foreign Application Priority Data

Apr. 30, 2020 (CN) .......................... 202010365402.7

(51) Int. Cl.
*F16K 31/53* (2006.01)
*A47J 31/46* (2006.01)
(Continued)

(52) U.S. Cl.
CPC ............. *F16K 31/53* (2013.01); *A47J 31/461* (2018.08); *F16K 11/0743* (2013.01);
(Continued)

(58) Field of Classification Search
CPC .. A47J 31/461; F16K 11/0743; F16K 31/535; F16K 31/043
See application file for complete search history.

(56) References Cited

U.S. PATENT DOCUMENTS

| 290,299 | A | * | 12/1883 | White | ..................... F16H 27/08 74/435 |
| 1,846,785 | A | * | 2/1932 | Breitling | ................. F16H 19/08 74/435 |

(Continued)

FOREIGN PATENT DOCUMENTS

| CN | 102100490 A | 6/2011 |
| CN | 102364180 A | 2/2012 |

(Continued)

OTHER PUBLICATIONS

International Search Report issued in corresponding PCT Application No. PCT/CN2021/078967, dated Jun. 3, 2021.
(Continued)

*Primary Examiner* — Umashankar Venkatesan
(74) *Attorney, Agent, or Firm* — Westbridge IP LLC

(57) ABSTRACT

A diverter valve includes a diverter valve assembly, a diverter valve transmission assembly, a drive motor and a control device used to control the drive motor. Controlled by the control device, the drive motor drives the diverter valve transmission assembly to perform a transmission action, so as to drive the diverter valve assembly to perform switching actions. The diverter valve transmission assembly is an intermittent gear transmission assembly. Driven by the drive motor, each time the intermittent gear transmission assembly performs the transmission action at least once, the control device controls the drive motor to stop driving. In this way, during the action process, not only the transmission is stable and reliable, the noise is low, but it is also wear-resistant (Continued)

enough under high-frequency use, which can meet the requirements of long-term working consumption of the beverage machine.

11 Claims, 11 Drawing Sheets

(51) Int. Cl.
  *F16K 11/074* (2006.01)
  *F16K 31/04* (2006.01)
  *F16H 19/00* (2006.01)
  *F16H 27/08* (2006.01)
  *F16H 35/00* (2006.01)

(52) U.S. Cl.
  CPC .......... *F16K 31/043* (2013.01); *F16K 31/535* (2013.01); *F16H 19/001* (2013.01); *F16H 27/08* (2013.01); *F16H 35/00* (2013.01); *F16H 2035/006* (2013.01)

(56) References Cited

U.S. PATENT DOCUMENTS

| | | | | |
|---|---|---|---|---|
| 2,040,933 A * | 5/1936 | Gillen | ................. | F16H 19/08 |
| | | | | 74/435 |
| 3,813,952 A * | 6/1974 | Fehrenbacher | ...... | G04B 13/003 |
| | | | | 74/435 |
| 3,882,735 A * | 5/1975 | Shimodaira | ................ | B41J 1/32 |
| | | | | 74/435 |
| 3,884,088 A * | 5/1975 | Bertozzi | ................. | A47L 15/46 |
| | | | | 74/435 |
| 4,632,024 A | 12/1986 | Cortese | | |
| 6,272,973 B1 | 8/2001 | Fukushima et al. | | |
| 7,178,452 B2 * | 2/2007 | Fischer | ................... | A47J 31/40 |
| | | | | 99/302 R |
| 7,437,888 B2 * | 10/2008 | Son | ....................... | F16K 31/043 |
| | | | | 62/527 |
| 8,561,495 B2 * | 10/2013 | Trischberger | ......... | E05F 15/603 |
| | | | | 74/435 |
| 10,024,456 B2 * | 7/2018 | Lueders | ................ | F16K 31/535 |
| 10,443,487 B2 * | 10/2019 | Claywell | ............... | F16K 31/041 |
| 10,527,136 B2 * | 1/2020 | Roch | .................... | F16K 31/047 |
| 10,989,124 B2 * | 4/2021 | Yamaguchi | ........... | F02B 37/186 |
| 11,047,591 B2 * | 6/2021 | Konrad | ................... | F16H 33/02 |
| 2016/0348806 A1 | 12/2016 | Noritake et al. | | |
| 2020/0018416 A1 | 1/2020 | Yokoe et al. | | |
| 2022/0099351 A1 * | 3/2022 | Yokoe | ................... | F16K 31/535 |
| 2022/0412443 A1 * | 12/2022 | Kouno | ................... | F02B 37/18 |
| 2023/0097656 A1 * | 3/2023 | Min | ...................... | F25B 41/375 |
| | | | | 62/333 |

FOREIGN PATENT DOCUMENTS

| | | |
|---|---|---|
| CN | 106838380 A | 6/2017 |
| CN | 109998390 A | 7/2019 |
| CN | 212377408 U | 1/2021 |
| EP | 1300105 B1 | 6/2004 |
| JP | 2008511807 A | 4/2008 |
| JP | 2016223540 A | 12/2016 |
| WO | 2018115910 A1 | 6/2018 |

OTHER PUBLICATIONS

Written Opinion issued in corresponding PCT Application No. PCT/CN2021/078967, dated Jun. 3, 2021.
European Search Report issued in counterpart European Patent Application No. EP 21796840.3, dated Jul. 24, 2023.
Refusal Notice issued in counterpart Japanese Patent Application No. 2022-543545, dated Sep. 11, 2023.

* cited by examiner

DIVERTER VALVE

CROSS-REFERENCE TO RELATED APPLICATIONS

This application is a continuation of International Application No. PCT/CN2021/078967, filed on Mar. 3, 2021, which claims priority to Chinese Patent Application No. CN202010365402.7, filed on Apr. 30, 2020. The disclosures of the aforementioned applications are hereby incorporated by reference in their entireties.

TECHNICAL FIELD

The present application relates to a field of steam/liquid diverting technologies in a beverage machine, and in particular to a diverter valve.

BACKGROUND

In the related art, in the field of beverage machines, especially in the field of a coffee maker, it is often necessary to prepare different beverages (such as different flavors or types of coffee) and use different liquids or gases (for example, the preparation of coffee requires to use milk, milk froth, hot water or steam). In order to achieve the above purpose, an ordinary beverage machine is equipped with a plurality of one-way valves, and the one-way valves are, controlled manually or controlled automatically by a program, connected to functional elements such as a hot water generator, a hot water outlet nozzle of a steam generator or a steam outlet nozzle of the steam generator. When a functional element needs to be used, the one-way valve corresponding to the functional element is controlled to be opened. However, a disadvantage of this implementation is that it requires a lot of parts and a complicated installation process. Therefore, a multi-way valve appears as an alternative to a control way in which several one-way valves are used.

However, in order to meet the requirements of frequent switching actions of beverage machines, the existing multi-way valve, such as the Maltese cross disc valve, not only has a complicated production process, but also is prone to wear and noise, which cannot meet the requirements of high-frequency use scenarios and long-term life, and also affects the experience of the beverage machine. Therefore, how to provide a beverage machine with stable and reliable operation, low noise, and improved user experience, on the basis of reducing the cost and the difficulty of the production process, is one of hot issues in current research.

SUMMARY

The present application provides a diverter valve with stable transmission, wear resistance, long service life, stable and reliable operation and low noise.

In order to solve the above-mentioned problems in the related art, while considering the problems of cost reduction and production process, a diverter valve with stable and reliable operation and low noise is provided. The present application provides a diverter valve, which includes a diverter valve assembly, a diverter valve transmission assembly, a drive motor and a control device used to control the drive motor. The drive motor drives the diverter valve transmission assembly to perform a transmission action under control of the control device, so as to drive the diverter valve assembly to perform switching actions. The diverter valve transmission assembly is an intermittent gear transmission assembly. Driven by the drive motor, each time the intermittent gear transmission assembly performs the transmission action at least once, the control device controls the drive motor to stop driving.

The intermittent gear transmission assembly includes a drive gear and a transmission gear meshed with each other. The drive gear is connected to the drive motor. The transmission gear is connected to the diverter valve assembly. Each time the drive motor performs a driving action at least once under control of the control device, the drive gear drives the transmission gear to rotate by a certain angle, and when the transmission gear rotates, the transmission gear drives the diverter valve assembly to rotate so as to perform a switching action of the diverter valve assembly. In the application, the intermittent gear transmission assembly transfers torque through the engagement of gears, and the contact area between the gears is large and the pressure is small. Therefore, during the action process, not only the transmission is stable and reliable, the noise is low, but it is also wear-resistant enough under high-frequency use, which can meet the requirements of long-term working consumption of the beverage machine.

A part of an arc surface of the drive gear is provided with at least one drive tooth segment, another part of the arc surface without a drive tooth segment is provided with at least one disc-shaped projection segment. One drive tooth segment and one disc-shaped projection segment belong to a drive group. The transmission gear is provided with a plurality of transmission tooth groups. Each the transmission tooth group is matched with a corresponding drive group thereof. Each time the drive motor performs the driving action at least once, a drive tooth of a drive tooth segment on the drive gear drives a transmission tooth group on the transmission gear to rotate.

Based on the above solutions, the present application provides the following three possible preferred embodiments. In the first preferred embodiment, there is one drive tooth segment on the drive gear, there is one or more drive teeth in each drive tooth segment, there is one disc-shaped projection segment on the drive gear, and the disc-shaped projection segment surrounds the part of the arc surface without a drive tooth segment. In the second preferred embodiment, there are a plurality of drive tooth segments on the drive gear, the plurality of drive tooth segments are arranged at intervals, there are a plurality of disc-shaped projection segments on the drive gear, and the plurality of disc-shaped projection segments are respectively arranged in the intervals between the plurality of drive tooth segments. In the third preferred embodiment, there are a plurality of drive teeth in each drive tooth segment, and the plurality of drive teeth vary in height. In the above-mentioned three possible preferred embodiments, it is implemented to transfer torque by engagement of gears, and the transmission is stable and reliable, and the noise is low.

Based on the first and second possible preferred embodiments above-mentioned, there are preferably two possible solutions. In one possible solution, a height of the disc-shaped projection segment in the drive group is less than a height of each drive tooth in the drive tooth segment, and correspondingly, in the plurality of transmission tooth groups on the transmission gear, each transmission tooth group includes a long tooth, a short tooth meshed with a drive tooth, and a stop groove. In this case, after the drive tooth drives the short tooth, the disc-shaped projection segment is engaged in the subsequent stop groove for stopping, and the drive tooth continues to idle until returning to the initial position. In the other possible solution, a height of the disc-shaped projection segment in the drive group is equal to a height of each drive tooth in the drive tooth segment, and correspondingly, in the plurality of transmission tooth groups on the transmission gear, each transmission tooth group includes a transmission tooth meshed with a drive tooth in a drive tooth segment. In this case, after driving the corresponding transmission tooth, the drive tooth continue to idle until returning to the initial position.

Based on the third possible preferred embodiment abovementioned, preferably, in the plurality of transmission tooth groups on the transmission gear, each transmission tooth group includes a plurality of transmission teeth with various heights and matched with the plurality of drive teeth, and a stop groove is formed in each transmission tooth group. In this case, after the plurality of drive teeth drive the transmission teeth, a disc-shaped projection segment on the drive gear is engaged with the stop groove and stops the transmission gear, and the drive teeth continue to idle until returning to the initial position.

The control device of the diverter valve provided in the present application includes a memory used to record rotational position information of the intermittent gear transmission assembly, how many times the drive motor drives, and/or position change of the diverter valve assembly. By means of the memory, the related information of the intermittent gear transmission assembly, the drive motor and/or the diverter valve assembly can be stored in time. The control device can accurately control the intermittent gear transmission assembly and the drive motor according to the related information, so as to ensure the reliability and stability of the beverage machine.

The diverter valve further includes a reset device. Controlled by the control device, the reset device drives the intermittent gear transmission assembly to reset automatically before each action. Preferably, the reset device may be a micro switch. By means of the reset device, it can be ensured that the intermittent gear transmission assembly can return to the initial position before each action, so as to ensure that each action is a complete action process, thereby further ensuring the precise angle positioning of the intermittent gear assembly during action.

The drive gear and the transmission gear of the intermittent gear transmission assembly are made of plastic material and are integrally formed. Compared with the Maltese cross transmission in the related art, this implementation not only reduces the cost, but also has a relatively simple production process.

The diverter valve assembly includes a diverting movable block and a diverting main way block which are concentrically arranged, the diverting main way block is provided with a plurality of through holes, the diverting movable block is provided with at least one communication groove, and the at least one communication groove is used to provide communication between at least two through holes on the diverting main way block.

The diverting main way block is provided with a plurality of communication grooves, the diverting movable block and the communication grooves on the diverting main way block cooperate with each other to provide communication between at least two through holes on the diverting main way block. Specifically, the diverting movable block on the diverter valve assembly is connected to the transmission gear of the intermittent gear transmission assembly. When the drive motor drives the intermittent gear transmission assembly to rotate, the diverting movable block rotates driven by the transmission gear, so that the communication grooves on the diverting movable block provide communication between various through holes on the diverting main way block, thereby realizing a switching communication between various pipelines, realizing the possibility of multifunctional switching of the beverage machine, and meet the requirements that the beverage machine needs to prepare different beverages and perform other functions such as cleaning.

The technical solutions provided by the present application has the following beneficial effects:

In the present application, the intermittent gear transmission assembly transfers torque through the engagement of gears, and the contact area between the gears is large and the pressure is small. Therefore, during the action process, not only the transmission is stable and reliable, the noise is low, but it is also wear-resistant enough under high-frequency use, which can meet the requirements of long-term working consumption of the beverage machine.

BRIEF DESCRIPTION OF THE DRAWINGS

In order to illustrate the technical solutions in the specific embodiments of the present application more clearly, the accompanying drawings required for the description of the embodiments will be briefly introduced below. Obviously, the drawings described below are only some embodiments of the application. For those of ordinary skill in the art, other drawings can also be obtained from these drawings without creative effort.

FIGS. 6A to 6F are schematic structural plan views showing the cooperating relationship of a diverting main way block and a diverting movable block of the diverter valve assembly of the diverter valve provided in the first specific embodiment of the present application, wherein FIG. 6A shows the relative positional relationship between the diverting main way block and the diverting movable block in an initial preparation state; FIG. 6B shows the relative positional relationship between the diverting main way block and the diverting movable block in a state when the pressure is being relieved; FIG. 6C shows the relative positional relationship between the diverting main way block and the diverting movable block when hot milk/hot milk froth is being prepared; FIG. 6D is the relative positional relationship between the diverting main way block and the diverting movable block when hot water is being provided; FIG. 6E shows the relative positional relationship between the diverting main way block and the diverting movable block when a milk frother is being cleaned; FIG. 6F shows the state when no function is being performed.

DETAILED DESCRIPTION OF THE EMBODIMENTS

Figure 1:
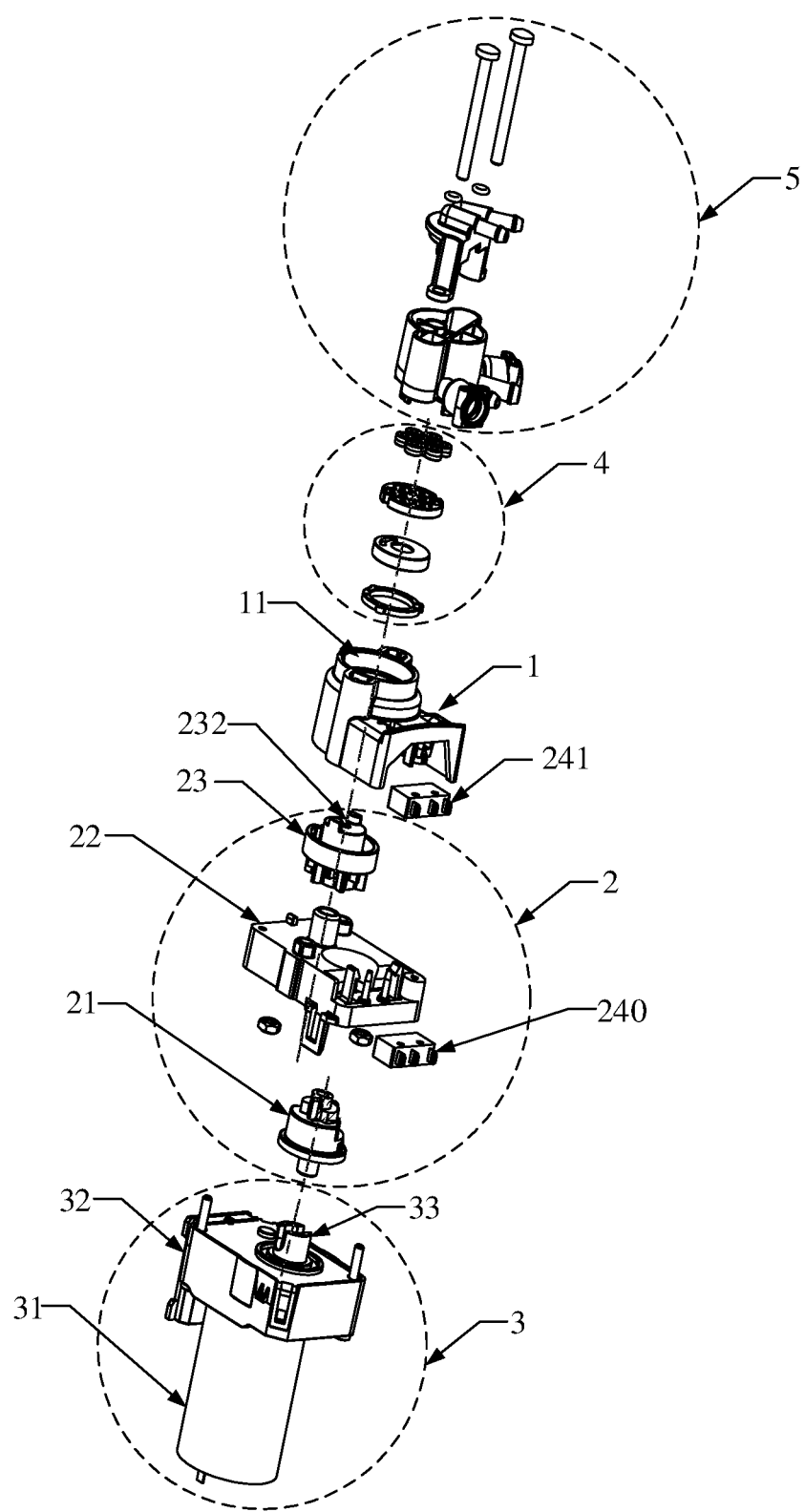
FIG. 1 is a schematic exploded structural diagram of a diverter valve according to a first specific embodiment of the present application.

The following describes the technical solutions in the embodiments of the present application clearly and overall. Obviously, the described embodiments are a part (rather than all) of the embodiments of this disclosure. All other embodiments obtained by a person of ordinary skill in the art based on the embodiments of the present application shall fall within the protection scope of this disclosure.

At present, a ceramic disc valve as a multi-way valve is widely used. The ceramic disc valve includes a diverting movable block and a diverting main way block cooperating with each other. Several through holes are disposed on the diverting main way block, and each through hole corresponds to a functional element. The diverting movable block is provided with a communication groove. The communication groove can provide communication between two of the through holes on the diverting main way block. That is to say, the communication groove can indirectly provide communication between the functional elements corresponding to the two through holes on the diverting main way block, for example, the communication groove can indirectly provide communication between the steam generator and the steam outlet nozzle, or indirectly provide communication between the hot water generator and the hot water outlet nozzle. When it is needed to switch functions, the drive assembly drives the diverting movable block to rotate, so that the communication between various functional elements are switched by changing the positional relationship between the communication groove on the diverting movable block and the through holes on the diverting main way block. In the related art, a ceramic disc valve mainly includes a fixed ceramic disc and a rotatable ceramic disc concentric with the fixed ceramic disc. The fixed ceramic disc has through holes that are fixedly connected to inlet and outlet pipelines of liquid or steam needed to be controlled. One side of the fixed ceramic disc is provided with an elastic seal and communicates with the pipeline channels through the elastic seal, and the other side is in contact with a rotary disc valve. During operating, by rotating the rotary disc valve to a selected rotation angle position, it is realized for the rotary disc valve to be connected to the inlet and outlet of the fixed ceramic disc. The drive motor used to adjust the ceramic disc valve may be controlled manually or controlled automatically by a program.

To realize precise angle positioning of the disc valve so as to quickly and accurately cover an opening on the disc valve needed to be connected is the guarantee for the multi-way valve to provide a reliable and uniform flow. In the related art, a more common disc valve with good suitability is a Maltese cross disc valve, which has a Maltese cross transmission device between the drive motor and the ceramic disc valve. The transmission device includes a Maltese swash plate with radial drive grooves and a drive pin connected to a drive motor. Driven by the drive motor, each time the drive pin rotates, the drive pin is screwed into a radial drive groove in the Maltese cross disc, thereby driving the Maltese cross disc to rotate one step. Each time the Maltese cross disc rotates one step, the Maltese cross disc drives the above-mentioned rotary disc valve to rotate, so as to perform various switching actions for changing communication relationship between pipelines.

However, since a switching action of a liquid/steam path needs to be performed frequently in a beverage machine, there are high requirements for wear resistance and rigidity of valves for switching the liquid/steam path. In view of these requirements, combined with structure characteristics of a Maltese cross driving structure itself, in the transmission device, a drive pin shaft of the drive pin is made of metal material and a base is made of plastic material, and the two are integrated into a whole. In this way, the metal material can meet the requirements of wear resistance and rigidity, and that the base is a plastic member can reduce the cost in material to a certain extent. However, in this way, the requirements for production processes will be correspondingly increased, and the corresponding production processes will be more complicated. In addition, since switching actions for liquid paths are performed frequently in the beverage machine, the acceleration changes greatly at the beginning and ending of the rotating process of the drive pin shaft, thus there is a flexible impact on the drive pin shaft, which is prone to wear the drive pin shaft. After wear occurs, the degree of wear will increase exponentially, which will lead to failure to meet the requirements of high-frequency usage scenarios and long-cycle life. In addition, given the cooperation between the drive pin and a sheave in a Maltese cross disc (i.e., one is made of metal material and the other is made of plastic material, and the strength of the two materials is inconsistent), after a gap caused by wear has appeared, it is prone to generate noise when impacts caused by engagement and disengagement occur, which affects the user experience of the beverage machine.

The First Specific Embodiment

This embodiment provides a diverter valve, which includes a diverter valve assembly, a diverter valve transmission assembly, a drive motor and a control device used to control the drive motor. Controlled by the control device, the drive motor drives the diverter valve transmission assembly to perform a transmission action, so as to drive the diverter valve assembly to position in steps. The diverter valve transmission assembly is an intermittent gear transmission assembly. Driven by the drive motor, each time the intermittent gear transmission assembly performs the transmission action at least once, the control device controls the drive motor to stop driving.

The intermittent gear transmission assembly includes a drive gear and a transmission gear, and the drive gear is meshed with the transmission gear. The drive gear is connected to the drive assembly, and the transmission gear is connected to the diverter valve assembly. Controlled by the control device, each time the drive motor performs a driving action at least once, the drive gear drives the transmission gear to rotate by a certain angle. When the transmission gear rotates, the transmission gear drives the diverter valve assembly to rotate, so as to perform a switching action of the diverter valve assembly.

Specifically, the present embodiment exemplarily provides a diverter valve. A schematic exploded structural diagram of the diverter valve is shown in FIG. 1. The diverter valve includes a diverter valve body 1, and further includes an intermittent gear transmission assembly 2 and a drive assembly 3 which are arranged on one side of the diverter valve body 1 in sequence, and further includes a diverter valve assembly 4 and a water diverting seat assembly 5 which are arranged on the other side of the diverter valve body 1 in sequence. An accommodating groove 11 is provided on the diverter valve body 1. A part of the intermittent gear transmission assembly 2 and a part of the diverter valve assembly 4 are connected to each other in the accommodating groove 11. In addition, the diverter valve in this embodiment further includes a control device (not shown in the figure), the control device is used to control the drive assembly 3. Driven by the control device, the drive assembly 3 can drive the intermittent gear transmission assembly 2 to perform a transmission action, so as to drive the diverter valve assembly 2 to position in steps, thereby performing switching actions of the diverter valve assembly 2. Each time the drive assembly 3 in this embodiment performs at least one drive action, the control device controls the drive assembly 3 to stop driving.

Specifically, as shown in FIG. 1, on one side of the diverter valve body 1, the drive assembly 3 includes a drive motor 31 and a reduction gearbox 32 integrated with the drive motor 31. The reduction gearbox 32 is provided with an output shaft 33, and the output shaft 33 can rotate driven by the drive motor 31 and the reduction box 32.

The intermittent gear transmission assembly 2 includes a drive gear 21, a diverting gear fixing seat 22 and a transmission gear 23 which are arranged in sequence. The drive gear 21 and the transmission gear 23 is meshed with each other.

A part of an arc surface of the drive gear 21 is provided with a plurality of drive tooth segments, a part, which is not provided with a drive tooth segment, of the arc surface is provided with a disc-shaped projection segment, and one drive tooth segment and one disc-shaped projection segment belong to a drive group. The transmission gear is provided with a plurality of transmission tooth groups, and each transmission tooth group is matched with a corresponding drive group thereof. Each time the drive motor 31 performs the driving action at least once, a drive tooth of a drive tooth segment on the drive gear 21 drives a transmission tooth group on the transmission gear 23 to rotate.

Figure 2:
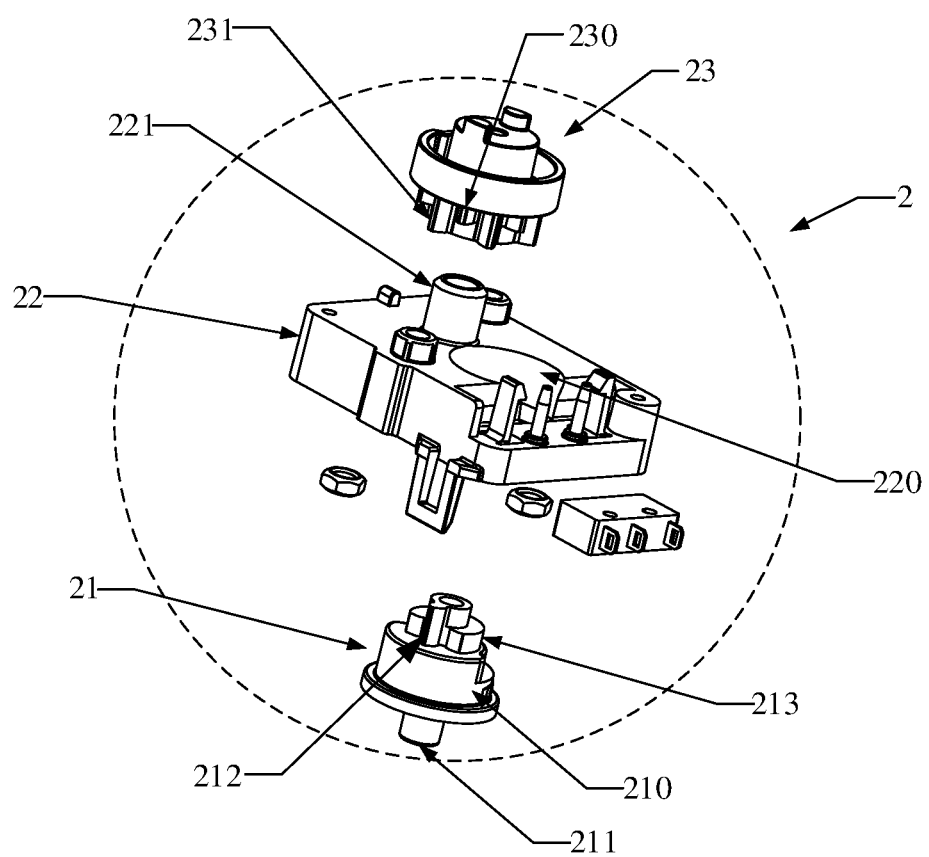
FIG. 2 is a schematic partial enlarged structural diagram of an intermittent gear transmission assembly of the diverter valve according to the first specific embodiment of the present application.

Specifically, a preferred solution is given in this embodiment, and a partial enlarged diagram of the drive gear 21 and the transmission gear 23 in the preferred solution is shown in FIG. 2. There is one drive tooth segment on the drive gear 21, there is also one drive tooth 212 in the drive tooth segment, and the disc-shaped projection segment 213 surrounds a remaining non-drive tooth segment.

More specifically, in this embodiment, a height of the disc-shaped projection segment 213 in the drive gear 21 is less than a height of the drive tooth 212 in the drive tooth segment. Correspondingly, in a plurality of transmission tooth groups provided on the transmission gear 23, each transmission tooth group includes a long tooth 231, a short tooth 230 meshed with the drive tooth 212, and a stop groove. In detail, as shown in FIG. 2, the drive gear 21 in this embodiment includes a base 210, a drive shaft 211 arranged at the bottom of the base 210, a drive tooth 212 arranged on the base 210, and a disc-shaped projection segment 213 surrounding the driving tooth 212 and lower than the drive tooth 212. The drive shaft 211 at the bottom of the base 210 is connected to the output shaft 33 on the reduction gearbox 32. The drive shaft 211 can rotate driven by the output shaft 33, thereby driving the whole drive gear 21 to rotate. The diverting gear fixing seat 22 is provided with a through hole 220 used to accommodate the drive gear 21, and further provided with a support shaft 221 used to install the transmission gear 23. The drive tooth 212 on the drive gear 21 and the disc-shaped projection segment 213 surrounding the drive tooth 212 pass through the through hole 220 to another side, and are engaged with the transmission gear 23. The transmission gear 23 is sleeved on the support shaft 221 of the diverting gear fixing seat 22. The transmission gear 23 is provided with short teeth 230 and long teeth 231 arranged alternately. One short tooth 230 and one long tooth 231 belong to a transmission tooth group. The space defined by every two adjacent long teeth and a short tooth therebetween is formed as a stop groove. In this embodiment, a tooth width of the short tooth 230 is half that of the long tooth 231. However, the present application is not limited to this case. That is to say, the ratio between the tooth width of the short tooth 230 and that of the long tooth 231 may also be other value, as long as it is ensured that the drive tooth 212 on the drive gear 21 can move the short tooth 230 on the transmission gear 23 and the disc-shaped projection segment 213 can be locked into the stop groove. Through the short tooth 230 and the long tooth 231, the transmission gear 23 is meshed with the drive tooth 211 and the disc-shaped projection segment 213 on the drive gear 21 so as to realize intermittent transmission.

Figure 3A:
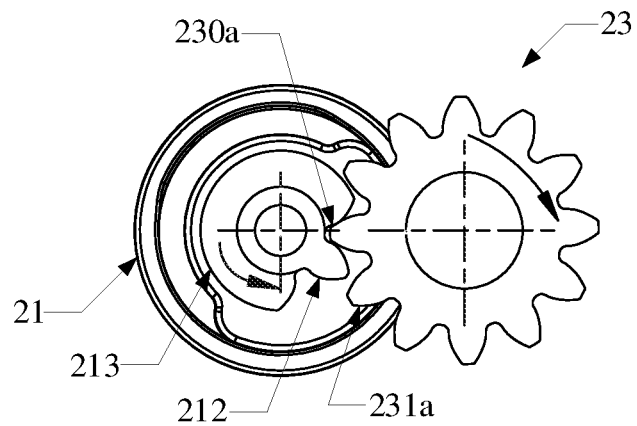
FIGS. 3A to 3C are schematic structural plan views showing a specific driving engagement process of the intermittent gear transmission assembly of the diverter valve according to the first specific embodiment of the present application.
Figure 3B:
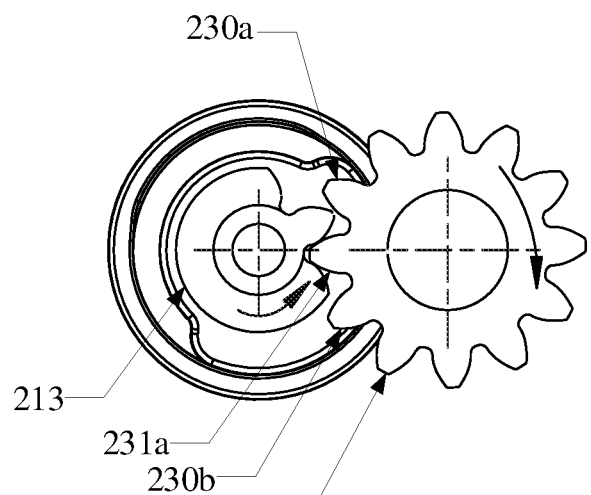
Figure 3C:
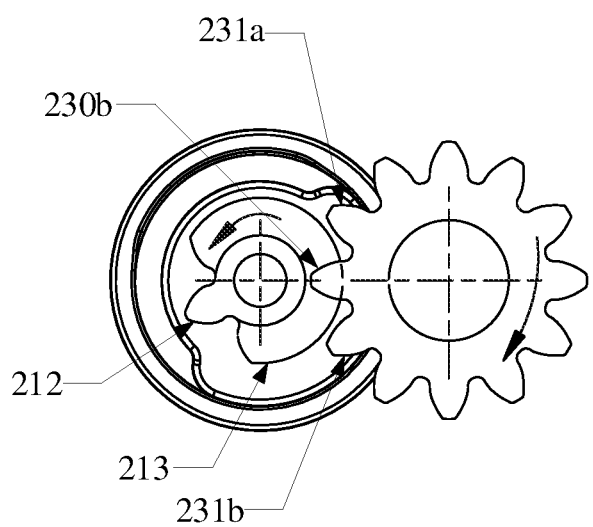

A schematic plan view of a specific action process of the intermittent gear transmission assembly 2 is specifically shown in FIGS. 3A to 3C. In an initial state, the relative positions of the drive gear 21 and the transmission gear 23 is shown in FIG. 3A. At this time, the drive tooth 212 on the drive gear 21 is located between a short tooth 230a and a next long tooth 231b on the transmission gear 23. When the drive motor 31 starts to drive, in one cycle of a driving action, the output shaft 33 on the drive assembly 3 drives the drive tooth 212 on the drive gear 21 to move the short tooth 230a on the transmission gear 23 forward, as shown in FIG. 3B. At this time, the disc-shaped projection segment 213 begins to engage into a stop groove formed by a long tooth 231a and next group including a long teeth 231b and a short tooth 230b. During the engagement of the disc-shaped projection segment 213, the disc-shaped projection segment 213 can drive the long tooth 231a to move forward for a certain distance until a front end of the disc-shaped projection segment 213 completely enters the stop groove, at which time the transmission gear 23 is stopped. During the stopping process, the drive tooth 212 on the drive gear 21 continues to idle until returning to the position of the initial state. The idling process is specifically shown in FIG. 3C.

Figure 4A:
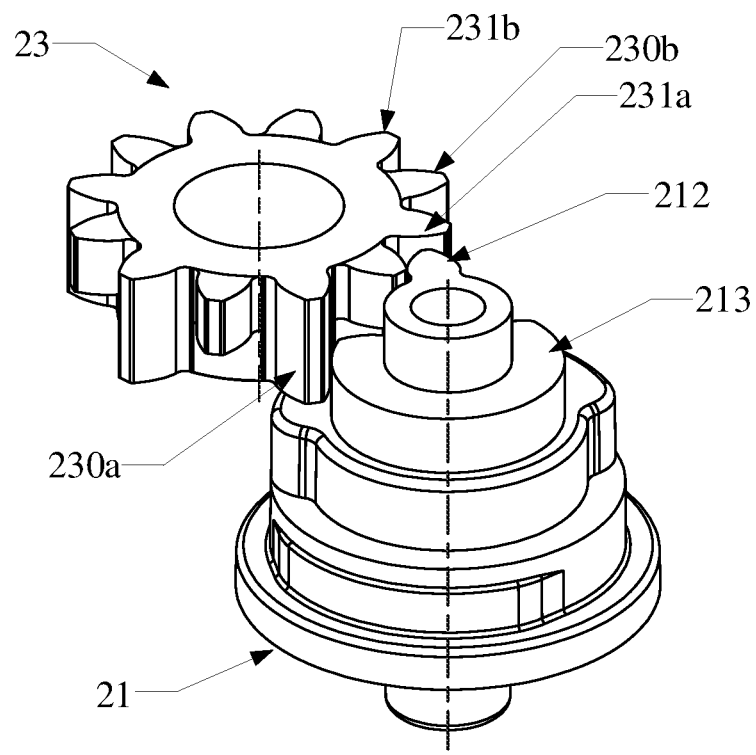
FIGS. 4A and 4B are schematic perspective structural diagrams showing a part of an action process of a drive gear and a transmission gear of the diverter valve according to the first specific embodiment of the present application.
Figure 4B:
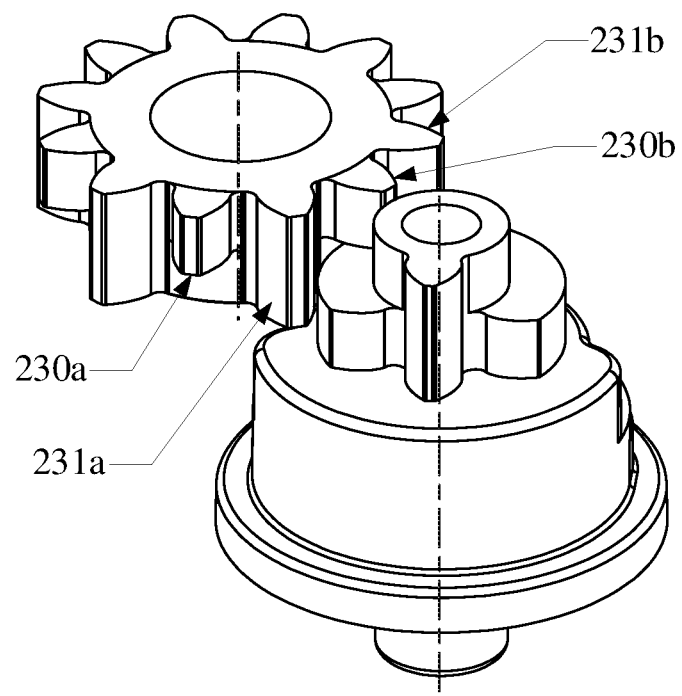

In addition, in order to further illustrate the action process of the drive gear 21 and the transmission gear 23 in this embodiment, FIGS. 4A and 4B are schematic perspective structural diagrams showing the engagement process of the two. FIG. 4A is a schematic perspective structural diagram showing the drive gear 21 and the transmission gear 23 in the initial position. FIG. 4A corresponds to the schematic plan view FIG. 3A. FIG. 4B is a schematic perspective structural diagram showing that the disc-shaped projection segment 213 is engaged in the stop groove formed by the long tooth 231a and the next transmission tooth group 230b, 231b after the drive gear 21 drives the transmission gear group 230a, 231a. FIG. 4B corresponds to the schematic plan view FIG. 3C.

In this embodiment, both the drive gear 21 and the transmission gear 23 of the intermittent gear transmission assembly 2 are made of plastic material, and each of them have an integrative structure. Compared with a Maltese cross transmission device with integrated a metal drive pin on a plastic base in the related art, the implementation of the present application not only reduces the cost, but also has a relatively simple production process, and improves the structure stability.

In this embodiment, as shown in FIG. 1, the diverter valve assembly 4 and the water diverting seat assembly 5 provided on the other side of the diverter valve body 1 are connected to the intermittent gear transmission assembly 2 through the accommodating groove 11 on the diverter valve body 1. Specifically, a part of the transmission gear 23 of the intermittent gear transmission assembly 2 extends into the accommodating groove 11 of the diverter valve body 1, the part of the transmission gear 23 extending into the accommodating groove 11 is provided with two fixing lugs 232, the two fixing lugs 232 are used to connect to the diverter valve assembly 4.

Figure 5:
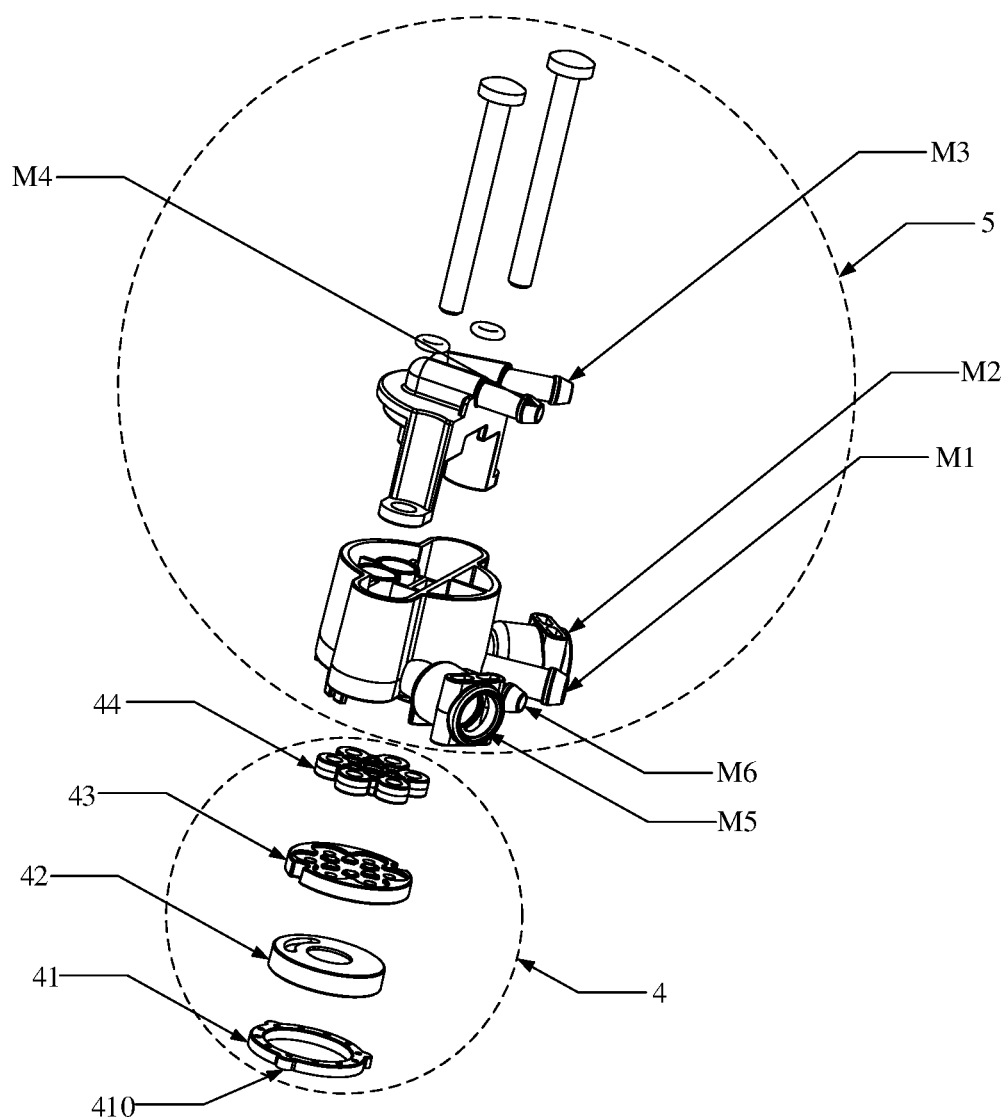
FIG. 5 is a partial enlarged structural diagram of a diverter valve assembly and a water diverting seat assembly of the diverter valve according to the first specific embodiment of the present application.

Specifically, FIG. 5 is a partial enlarged structural diagram of the diverter valve assembly 4 and the water diverting seat assembly 5 on another side of the diverter valve body 1. The diverter valve assembly 4 is located on another side of the diverter valve body 1, and it includes a diverting block base 41, a diverting movable block 42, a diverting main way block 43 and an elastic sealing connection member 44, which are arranged in sequence. The diverting block base 41, the diverting movable block 42 and the diverting main way block 43 are placed in the accommodating groove 11 of the diverter valve body 1 in sequence. In the diverter valve assembly, the diverting main way block 43 and the diverting movable block 42 are arranged concentrically. The diverting main way block 43 is provided with a plurality of through holes, and the diverting movable block 42 is provided with a plurality of communication grooves. The communication grooves on the diverting movable block 42 provide communication between at least two through holes on the diverting main way block 43. The main diverting channel block 43 is provided with an elastic sealing connection member 44, and the elastic sealing connection member 44 is correspondingly provided with through holes corresponding to the through holes on the diverting main way block 43. The diverting main way block 43 is in a sealed connection with the water diverting seat assembly 5 through the elastic sealing connection member 44.

As a preferred technical solution, in this embodiment, the diverting block base 41 is a ceramic ring, and its outer circumference is provided with a positioning protrusion 410. The positioning protrusion 410 matches the internal shape of the accommodating groove 11 in the diverter valve body 1, which is convenient for positioning and installation during installation. The diverting movable block is arranged on the ceramic ring. The diverting movable block 42 is a circular ceramic diverting movable block, and an arc-shaped communication groove is provided on one side of the diverting movable block 42 facing the diverting main way block 43, and the other side is provided with two grooves (not shown in the figure) corresponding to two fixing lugs 232 on the transmission gear 23. The two fixing lugs 232 on the transmission gear 23 are inserted into the two grooves, so as to realize the purpose of driving the diverting movable block 42 in the diverter valve assembly 4 to rotate when the transmission gear 23 rotates. Specifically, as shown in FIGS. 6A to 6F, the diverting main way block 43 is a circular ceramic diverting main way block, which is arranged on the diverting movable block 42, and the diverting main way block 43 is provided with six through holes which are arranged in a ring shape and are distributed evenly. The arc-shaped communication groove L1 on the diverting movable block 42 can realize to provide communication between any two adjacent through holes on the diverting main way block 43. In this embodiment, the arrangement of the six through holes on the diverting main way block 43 in a counterclockwise order are: a steam pressure relief port H1, a steam inlet H2, a steam outlet H3, a milk frother cleaning outlet H4, a hot water inlet H5 and a hot water outlet H6. Correspondingly, in this embodiment, the elastic sealing connection member 44 is provided with six through holes arranged in a ring shape, and it is realized that a sealing connection is formed between the diverting main way block 43 and the water diverting seat assembly 5 through the elastic sealing connection 44.

As shown in FIG. 5, the water diverting seat assembly 5 includes a plurality of flow pipes, and the plurality of flow pipes respectively correspond to the plurality of through holes on the main diverting channel block 43. During connection, one ends of the plurality of flow pipes are correspondingly connected to the plurality of through holes on the diverting main way block 43, and the other ends are connected to functional units in a beverage machine such as a coffee machine. For example, the functional units may be a steam generator, a hot water generator, a milk frother and other functional outlet nozzles. Specifically, in this embodiment, the water diverting seat assembly 5 is provided with six flow pipelines. One ends of the six flow pipelines are in communication with the six through holes on the diverting main way block, and the other ends are in communication with the functional units in the coffee machine. In this embodiment, the six flow pipelines provided on the water diverting seat are a steam pressure relief pipeline M1, a steam inlet pipeline M2, a steam outlet pipeline M3, a milk froth cleaning outlet pipeline M4, a hot water inlet pipeline M5 and a hot water outlet pipeline M6, respectively. One ends of the above-mentioned six flow pipelines are respectively connected to the six through holes on the diverting main way block, and the other ends are respectively connected to a steam pressure relief nozzle, a steam generator, a steam outlet nozzle, a milk frother, a hot water generator and a hot water outlet nozzle.

In this embodiment, the basic idea adopted in the connection relationship between the diverter valve assembly 4 and the water diverting seat assembly 5 is that the communication between the plurality of through holes on the diverting main way block 43 is realized through the communication grooves on the diverting movable block 42. Since the through holes on the diverting main way block 43 are connected to the respective flow pipelines on the water diverting seat assembly 5, it is realized to communicate the flow pipelines corresponding to the through holes communicated to each other on the diverting main way block 43. Based on the above basic idea, it can be understood that the communication groove on the diverting movable block 42 can achieve the purpose of providing communication among any number of through holes on the diverting main way block 43 by changing its length, shape, width, and the like, so as to realize the communication of any number of flow pipelines on the water diverting seat assembly 5, and how many flow pipelines are in communication with one another depends on the actual demand.

Figure 6A:
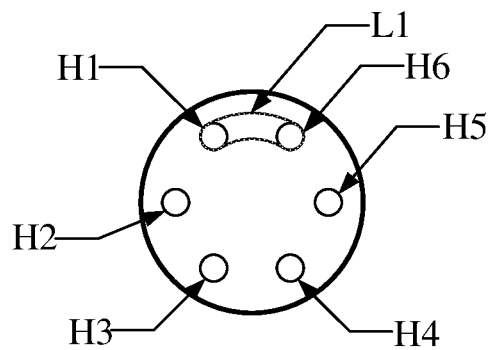
Figure 6B:
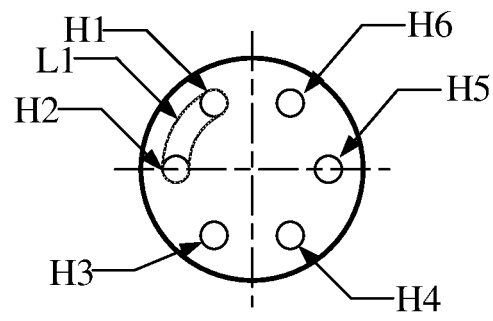
Figure 6C:
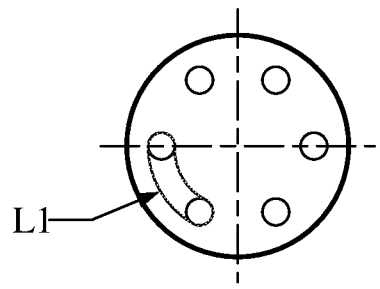
Figure 6D:
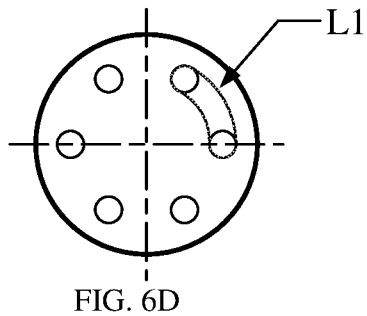
Figure 6E:
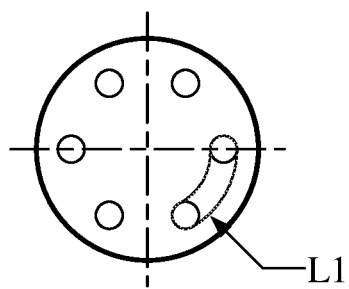
Figure 6F:
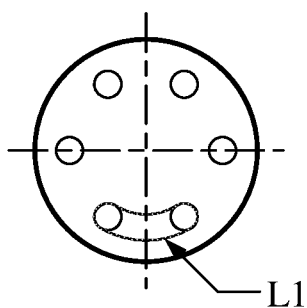

The specific working process of the diverter valve assembly 4 and the water diverting seat assembly 5 provided in this embodiment are shown in FIG. 6A to FIG. 6F. In the initial preparation state, as shown in FIG. 6A, the arc-shaped communication groove L1 on the diverting movable block 42 in the diverter valve assembly 4 provides communication between the two through holes, i.e., the steam pressure relief port H1 and the hot water outlet H6 on the diverting main way block 43. At this time, the steam pressure relief pipeline M1 and the hot water outlet pipeline M6 on the water diverting seat assembly 5 are in communication with each other, so that the steam pressure relief nozzle and the hot water outlet nozzle which are connected to the ends of two pipelines are communicated. At this time, since the two nozzles are in communication with the atmosphere, no function is realized by providing communication between the pipelines. After starting operation, if pressure relief action is required, as shown in FIG. 6B, the drive motor 31 performs the driving action once, the long drive tooth 212 and the disc-shaped projection segment 213 on the drive gear 21 are driven to rotate so as to drive the short tooth 230 and the long tooth 231 on the transmission gear 23 to rotate, thereby driving the diverting movable block 42 to rotate 60° counterclockwise. This will cause that the arc-shaped communication groove L1 on the diverting movable block 42 is switched to match the next group of adjacent through holes, i.e., the two through holes of the steam pressure relief port H1 and the steam inlet H2. At this time, the steam pressure relief pipeline M1 and the steam inlet pipeline M2 on the water diverting seat assembly 5 are in communication with each other, so that the steam in the steam generator connected to one end of the steam inlet pipeline M2 is released into the atmosphere through the steam pressure relief nozzle connected to one end of the steam pressure relief pipeline M1, thereby realizing the pressure relief function. When it is required to prepare hot milk and/or hot milk froth, as shown in FIG. 6C, the drive motor 31 performs the driving two times from the initial state, so that the diverting movable block rotates 120° counterclockwise, the arc-shaped communication groove L1 on the diverting movable block 42 provides communication between the steam inlet H2 and the steam outlet H3 on the diverting main way block 43. At this time, the steam inlet pipeline M2 and the steam outlet pipeline M3 on the water diverting seat assembly 5 are in communication with each other, so that the steam in the steam generator at one end of the steam inlet pipeline M2 is sent to the steam outlet nozzle at one end of the steam outlet pipeline M3, thereby heating the milk and/or milk froth with the steam. Analogously, when it is required to realize the delivery of hot water, as shown in FIG. 6D, the drive motor 31 performs the driving action five times, the diverting movable block 42 rotates 300° counterclockwise from the initial preparation position, and the hot water inlet H5 and the hot water outlet H6 on the diverting main way block 43 are communicated. At this time, the hot water inlet pipeline M5 and the hot water outlet pipeline M6 on the water diverting seat assembly 5 are in communication with each other, so that the hot water generator connected to one end of the hot water inlet pipeline M5 is in communication with the hot water outlet nozzle connected to one end of the hot water outlet pipeline M6, and the hot water in the hot water generator is flowed out from the hot water outlet nozzle. During performing the cleaning action of the milk frother, as shown in FIG. 6E, the communication groove L1 on the diverting movable block 42 provides communication between the milk froth cleaning outlet H4 and the hot water inlet H5 on the diverting main way block 43. At this time, the milk froth cleaning pipeline M4 and the hot water inlet pipeline M5 on the water diverting seat assembly 5 is in communication with each other, so that the hot water in the hot water generator connected to one end of the hot water inlet pipeline M5 is transported to the milk frother connected to one end of the milk froth cleaning outlet pipeline M4 to clean the milk frother. Through the cooperation of the diverter valve and the water diverting seat in this embodiment, it can be realized to switch communication relationship between various pipelines among the six pipelines so as to realizing the functions of heating milk, heating milk froth, heating water, and milk froth cleaning.

In addition, the diverter valve in this embodiment further includes a reset device. Controlled the control device, the reset device drives the intermittent gear assembly 4 to reset automatically before each driving action. Preferably, as shown in FIG. 1, in this embodiment, the reset device may be a micro switch 24, which includes two components 240, 241. The two components are respectively installed on the diverting gear fixing seat 22 and the diverter valve body 1 to ensure that the drive gear 21 and the transmission gear 23 in the intermittent gear assembly 4 return to the engagement position in the initial state before each driving action.

It can be understood that the above-mentioned drive motor 31 can also realize the function of rotating in the opposite direction driven by the control device. That is to say, for example, when it is required to delivery hot water, it can be performed by rotating 60° clockwise from the initial position. In addition, starting from the initial position, the diverter valve assembly 4 can be driven by the drive motor 31 to rotate in sequence to switch functions in sequence, the diverter valve assembly 4 also can be directly switched from the initial position to the required functional position through being driven by the drive motor 31 for many times.

It can be understood that, the diverting main way block 43 in this embodiment is provided with six through holes evenly distributed, therefore under the drive of the intermittent gear transmission assembly 2, the communication groove on the diverting movable block 42 can realize the requirement of switching the diverting movable block by 60° every time an action is performed. It should be noted that, the through holes on the diverting main way block in this embodiment may be arranged in other ways. There may also be a plurality of communication grooves on the diverting movable block according to the arrangement of the through holes on the diverting main way block. In addition, by changing the length, the shape, the width or other forms of the communication groove, it can be achieved to provide communication between at least two through holes on the diverting main way block. At the same time, due to the change of the arrangement of the through holes and the change of the communication groove, the required rotation angle of the intermittent gear for each transmission also changes. In this embodiment, it needs to be switched by at least 60°, and in other possible embodiments, it can also be switched to any other angle, which can be achieved only by adjusting the density of the gears.

In addition, in this embodiment, there is only one drive tooth segment on the drive gear 21 and there is only one drive tooth 212 in the drive tooth segment, but the present application is not limited thereto. That is, according to the requirement of the angle actually needed to be switched, in this application, a plurality of drive teeth 212 can be arranged in the drive tooth segment on the drive gear 21, and the plurality of drive teeth are continuously arranged. The disc-shaped projection segment surrounds the whole outer circumference of the remaining non-driving tooth segment from the starting end of the plurality of drive teeth to the ending end the plurality of drive teeth. Correspondingly, each transmission tooth group on the transmission gear 23 includes a plurality of short teeth 230 corresponding to the plurality of drive teeth 212.

The Second Specific Embodiment

The difference between this embodiment and the first specific embodiment is that the structure and transmission mode of the drive gear and the transmission gear in the intermittent gear transmission assembly in this embodiment are different.

In this embodiment, a height of the disc-shaped projection segment on the drive gear is equal to a height of the drive tooth in the drive tooth segment. Correspondingly, in transmission tooth groups on the transmission gear, each transmission tooth group includes a transmission tooth meshed with a drive tooth in the drive tooth segment. After the drive tooth on the drive gear drives the corresponding transmission tooth group, the drive tooth continue to idle until returning to the initial position.

Figure 7A:
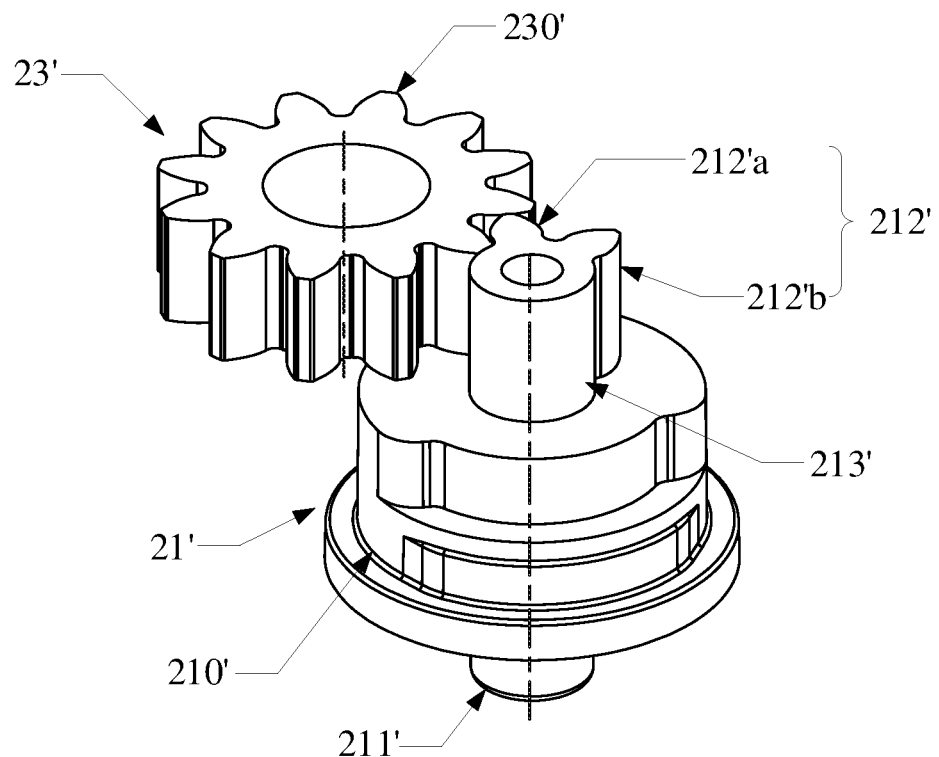
FIGS. 7A and 7B are schematic perspective structural diagrams of an intermittent gear transmission assembly of a diverter valve according to a second specific embodiment of the present application.
Figure 7B:
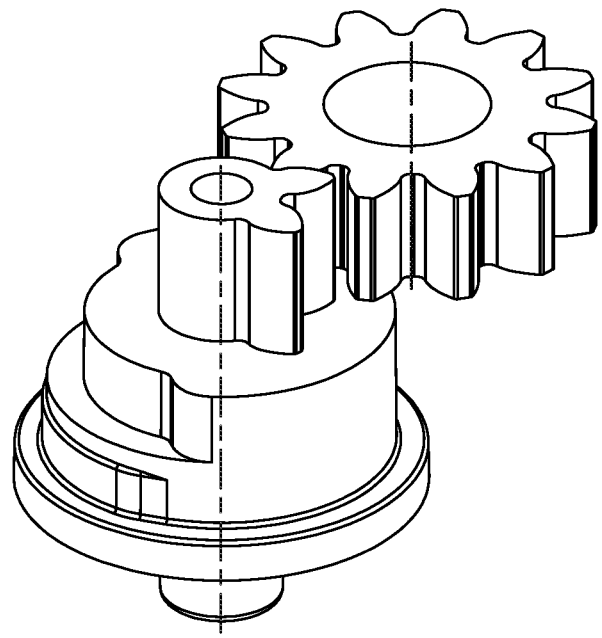

Specifically, as shown in FIGS. 7A and 7B, the intermittent gear transmission assembly in this embodiment includes a drive gear 21', a diverting gear fixing seat and a transmission gear 23'. The diverting gear fixing seat is the same as the diverting gear fixing seat 22 in the first specific embodiment, and the description is not repeated here. The drive gear 21' includes a base 210', a drive shaft 211' arranged at the bottom of the base 210', and a drive tooth segment arranged on the base 210'. The drive tooth segment includes two drive teeth 212'a, 212'b. A disk-shaped projection segment 213' having the same height as the two drive teeth is provided surrounding the two drive teeth. The drive shaft 211' at the bottom of the base 210' is connected to the output shaft of the reduction gearbox in the drive assembly, and the drive shaft 211' can rotate driven by the output shaft, thereby driving the whole drive gear 21' to rotate.

The transmission gear 23' in this embodiment is provided with transmission teeth 230' with the same shape and uniform distribution. Every two transmission teeth 230' on the transmission gear 23' belong to a transmission tooth group. The two drive teeth 212'a, 212'b on the drive gear 21' can continuously move the two transmission teeth on the transmission gear 23'. After moving, since the transmission gear 23' itself has damping, it can automatically stop inertial rotation in the state without being driven. At this time, the two drive teeth 212'a, 212'b continue to idle until returning to the initial position, and in the next drive process, they go ahead to move the next transmission tooth group on the transmission gear 23'.

Figure 8A:
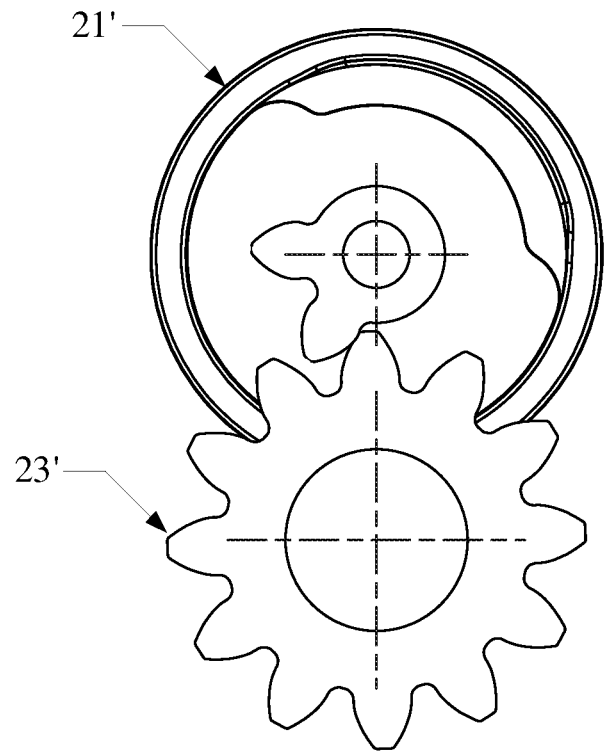
FIGS. 8A and 8B are schematic structural plan views showing the engagement process of the intermittent gear transmission assembly of the diverter valve according to the second specific embodiment of the application.
Figure 8B:
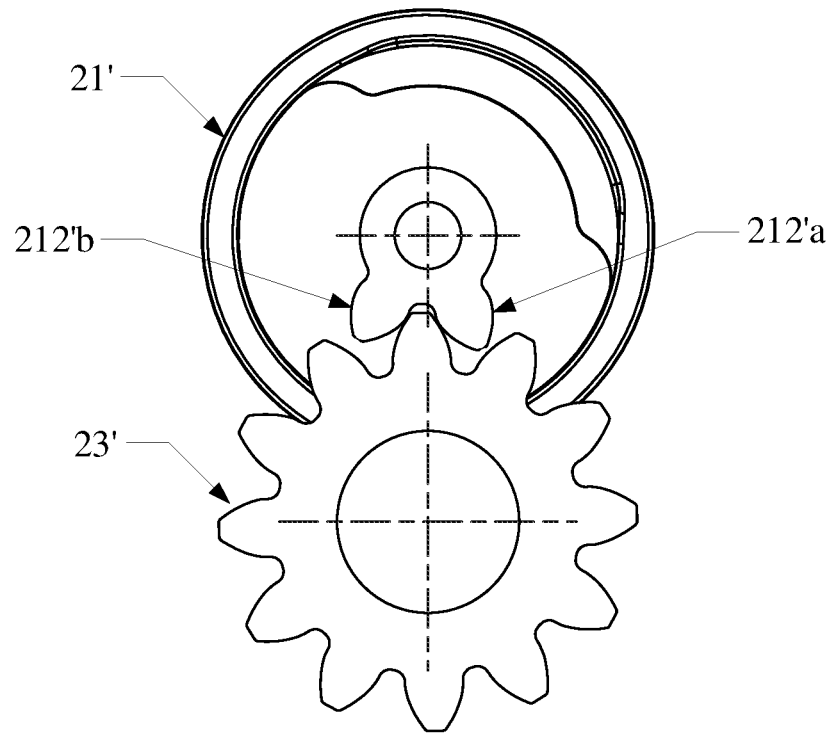

In order to further illustrate the transmission process of the drive gear 21' and the transmission gear 23' provided in this embodiment, FIG. 8A is a schematic diagram of the engagement state of the drive gear 21' and the transmission gear 23' in the initial position. FIG. 8B is a schematic diagram of the state in which the drive tooth 212'a on the drive gear 21' has completed to drive one transmission tooth, and the next drive tooth 212'b is ready to drive the next transmission tooth.

It can be understood that the two drive teeth 212' in this embodiment can continuously move the two adjacent transmission teeth 230' on the transmission gear 23'. It is also possible to change the interval between the two adjacent drive teeth 212' to realize moving the two nonadjacent transmission teeth 230' of the transmission gear 23', as required, this is specifically determined according to the angle by which the diverter valve assembly is needed to be switched each time.

It can be understood that in addition to changing the switching angle of each move by changing the interval between the drive teeth 212', the switching angle can also be changed by changing the density of the transmission teeth 230' on the transmission gear 23'. That is to say, the transmission teeth 230' on the transmission gear 23' in this embodiment are uniformly arranged and cover the entire circumference of the transmission gear, in the actual design, the arranged interval of the transmission teeth covering the entire circumference on the transmission gear 23' can be changed in the degree of density according to the actual rotation angle. An exemplary description is given in the fourth specific embodiment, but the present application is not limited thereto.

It can also be understood that the drive teeth 212' on the drive gear 21' are not limited to the two drive teeth 212'a, 212'b provided in this embodiment. According to the actual required angle, the number of the drive teeth 212' may be increased or decreased.

The transmission teeth on the transmission gear 23' may be arranged at intervals in groups. A plurality of transmission teeth belong to a group, the intervals between the groups are adjustable, and the intervals between the groups form stop grooves. Correspondingly, the number of drive teeth on the drive gear 21' corresponds to the number of the transmission teeth of each transmission tooth group on the above-mentioned transmission gear 23', and the exemplary embodiment thereof will not be described in detail.

The Third Specific Embodiment

This embodiment also provides another exemplary solution of the intermittent gear transmission assembly.

In this embodiment, there are a plurality of drive tooth segments on the drive gear, the plurality of drive tooth segments are arranged at intervals, and the disc-shaped projection segments are respectively arranged in the interval between the two drive tooth segments.

Figure 9:
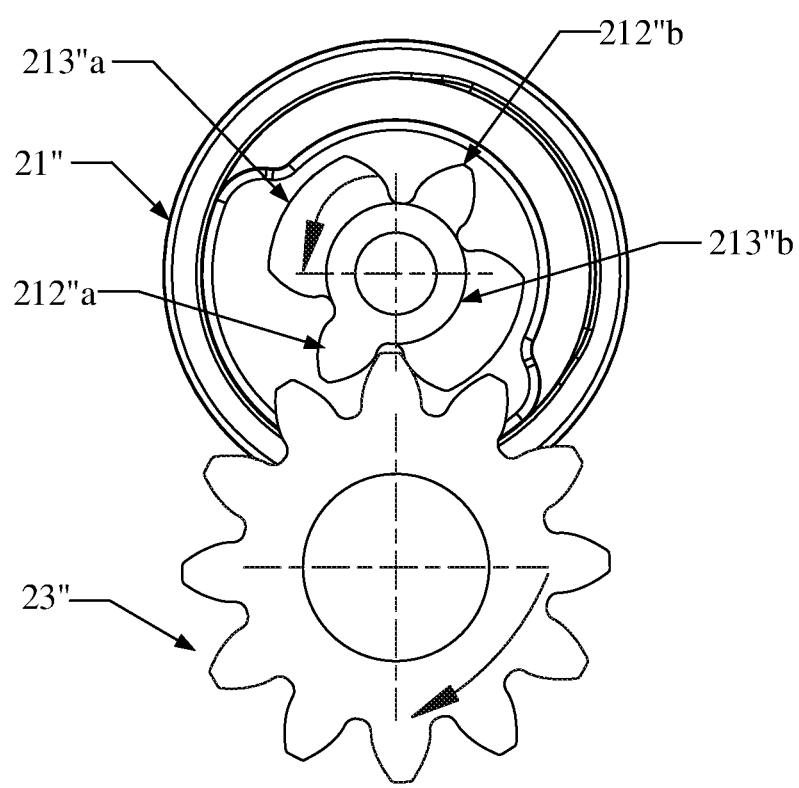
FIG. 9 is a schematic structural diagram of a drive gear and a transmission gear of an intermittent gear transmission assembly of a diverter valve according to a third specific embodiment of the application.

Specifically, as shown in FIG. 9, it is different from the drive gear 21 in the intermittent gear transmission assembly in the first specific embodiment, and the transmission gear is the same. In this embodiment, the drive gear is provided with two drive tooth segments, each drive tooth segments is provided with a drive tooth, and two separate disc-shaped projection segments are arranged between the two drive tooth segments. In detail, the drive gear 21" in this embodiment is provided with two drive teeth 212"a, 212"b. The two drive teeth 212"a, 212"b are oppositely arranged on the base of the drive gear 21" at an angle of 180°. The two disc-shaped projection segments 213"a, 213"b are separately arranged in the intervals between the two drive teeth. Correspondingly, the drive process is that the drive gear 21" can drive the transmission gear 23" to move a transmission tooth group forward every time the drive gear 21" rotates 180°.

The Fourth Specific Embodiment

Figure 10:
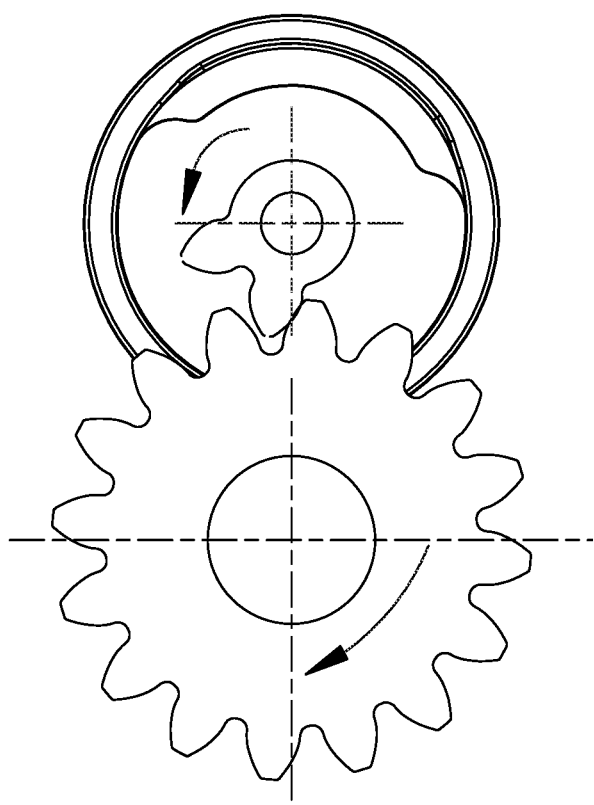
FIG. 10 is a schematic structural diagram of a drive gear and a transmission gear of an intermittent gear transmission assembly of a diverter valve according to a fourth specific embodiment of the application.

This embodiment is a supplementary exemplary description of the second specific embodiment, as shown in FIG. 10. In this embodiment, the number of teeth on a transmission gear is 16, and the number of teeth in the second specific embodiment is 12. That is to say, in this embodiment, the rotation angle each time the transmission gear is moved a tooth is different from that in the second specific embodiment. In other words, the rotation angle of each transmission action can be changed by changing the density of the gears.

In addition to the above-mentioned exemplary embodiments, the intermittent gear transmission assembly to be protected by the present application also includes another possible deformation solution. The possible deformation solution is: there are a plurality of drive teeth provided on a drive tooth segment of a part of the arc surface of the drive gear, and the plurality of drive teeth are vary in height. Correspondingly, in transmission tooth groups on the transmission gear, each transmission tooth group includes transmission teeth with various heights matched with the plurality of drive teeth, and a stop groove.

The diverter valve provided by the present application has been introduced in detail above. The present application describes the structure and working principle of the diverter valve in the present application through specific examples. The descriptions of the above embodiments are only used to help understand the implementation and core idea of the present application. It should be noted that for those skilled in the art, on the premise of not departing from the principles of the present application, several improvements and modifications can also be made to the present application, and these improvements and modifications also fall within the scope of protection of the claims of the present application.

What is claimed is:

1. A diverter valve, comprising a diverter valve assembly, a diverter valve transmission assembly, a drive motor and a control device used to control the drive motor, wherein the drive motor drives the diverter valve transmission assembly to perform a transmission action under control of the control device, so as to drive the diverter valve assembly to perform switching actions, the diverter valve transmission assembly is an intermittent gear transmission assembly, and each time the intermittent gear transmission assembly performs, driven by the drive motor, the transmission action at least once, the control device controls the drive motor to stop driving;

the intermittent gear transmission assembly comprises a drive gear and a transmission gear meshed with each other, the drive gear is connected to the drive motor, the transmission gear is connected to the diverter valve assembly, each time the drive motor performs a driving action at least once under control of the control device, the drive gear drives the transmission gear to rotate by a certain angle, and when the transmission gear rotates, the transmission gear drives the diverter valve assembly to rotate so as to perform a switching action; and a part of an arc surface of the drive gear is provided with at least one drive tooth segment, another part of the arc surface without a drive tooth segment is provided with at least one disc-shaped projection segment, and one drive tooth segment and one disc-shaped projection segment belong to a drive group; the transmission gear is provided with a plurality of transmission tooth groups, and each transmission tooth group is matched with a corresponding drive group thereof;

each time the drive motor performs the driving action at least once, a drive tooth of a drive tooth segment on the drive gear drives a transmission tooth group on the transmission gear to rotate.

2. The diverter valve according to claim 1, wherein there is one drive tooth segment on the drive gear, there are one or more drive teeth in each drive tooth segment, there is one disc-shaped projection segment on the drive gear, and the disc-shaped projection segment surrounds the part of the arc surface without a drive tooth segment.

3. The diverter valve according to claim 2, wherein a height of the disc-shaped projection segment in the drive group is less than a height of each drive tooth in the drive tooth segment of the drive group, and correspondingly, in the plurality of transmission tooth groups on the transmission gear, each transmission tooth group comprises a long tooth, a short tooth meshed with a drive tooth, and a stop groove.

4. The diverter valve according to claim 2, wherein a height of the disc-shaped projection segment in the drive group is equal to a height of each drive tooth in the drive tooth segment of the drive group, and correspondingly, in the plurality of transmission tooth groups on the transmission gear, each transmission tooth group comprises a transmission tooth meshed with a drive tooth in a drive tooth segment.

5. The diverter valve according to claim 1, wherein there are a plurality of drive tooth segments on the drive gear, the plurality of drive tooth segments are arranged at intervals, there are a plurality of disc-shaped projection segments on the drive gear, and the plurality of disc-shaped projection segments are respectively arranged in the intervals between the plurality of drive tooth segments.

6. The diverter valve according to claim 1, wherein there are a plurality of drive teeth in each drive tooth segment, and the plurality of drive teeth vary in height.

7. The diverter valve according to claim 6, wherein in the plurality of transmission tooth groups on the transmission gear, each transmission tooth group comprises a plurality of transmission teeth with various heights and matched with the plurality of drive teeth, and a stop groove.

8. The diverter valve according to claim 1, wherein the control device in the diverter valve comprises a memory used to record rotational position information of the intermittent gear transmission assembly, the number of driving actions performed by the drive motor, and/or position change of the diverter valve assembly.

9. The diverter valve according to claim 8, wherein the diverter valve further comprises a reset device, which drives, controlled by the control device, the intermittent gear transmission assembly to be reset automatically before each action.

10. The diverter valve according to claim 1, wherein the drive gear of the intermittent gear transmission assembly is made of plastic material and integrally formed, and the transmission gear of the intermittent gear transmission assembly is made of plastic material and integrally formed.

11. The diverter valve according to claim 1, wherein the diverter valve assembly comprises a diverting movable block and a diverting main way block which are concentrically arranged, the diverting main way block is provided with a plurality of through holes, the diverting movable block is provided with at least one communication groove, and the at least one communication groove is used to provide communication between at least two through holes on the diverting main way block.

* * * * *